Aug. 30, 1966  J. F. FISHER  3,269,424
PRESTRESSED CONCRETE CONDUIT AND METHOD
Filed July 30, 1963  2 Sheets-Sheet 1

INVENTOR.
JOHN F. FISHER
BY McLaughlin & Cahill
ATTORNEYS

Aug. 30, 1966 J. F. FISHER 3,269,424
PRESTRESSED CONCRETE CONDUIT AND METHOD
Filed July 30, 1963 2 Sheets-Sheet 2

INVENTOR.
JOHN F. FISHER
BY
McLaughlin & Cahill
ATTORNEYS

United States Patent Office 3,269,424
Patented August 30, 1966

3,269,424
PRESTRESSED CONCRETE CONDUIT
AND METHOD
John F. Fisher, P.O. Box 6497, Phoenix 5, Ariz.
Filed July 30, 1963, Ser. No. 298,749
5 Claims. (Cl. 138—176)

The present invention pertains to prestressed concrete structures and their method of manufacture, and more specifically, to concrete structures useful in those applications requiring a conduit such as a culvert.

The use of conduits and conduit systems in some applications is extremely cumbersome when the conduits take the form of prior art concrete structures. For example, culverts for use in highway construction may take several forms such as the well known corrugated pipe. These corrugated culverts are generally in the form of right circular cylinders with the corrugations extending around the circumference of the cylinder for strength. The right circular cylinder or nearly circular cylindrical shape is necessary for rigidity of the corrugated pipe. When the culvert of a given capacity is required, and corrugated pipe, or other cylindrical pipe, is used, the diameter or height of the pipe is frequently excessive since the depth to the bottom of the culvert from the surface of the roadway may be too great to provide natural drainage through the culvert. When problems of this nature arise, it is frequently necessary to utilize several pipes of smaller diameter arranged in parallel to accommodate the required capacity without requiring unnecessary depth beneath the roadway surface.

To achieve the necessary capacity without requiring unnecessary depth or excavation, concrete culverts are frequently utilized. The concrete culverts may be poured or prefabricated and shipped to the construction site. Pouring of concrete culverts may present insurmountable difficulties when the availability of mixed concrete is limited. Similarly, the weight of prefabricated concrete culverts may render transportation costs prohibitive. For example, prefabricated concrete culverts must, of course, be sufficiently rigid and have sufficient strength for the application intended; to achieve appropriate strength for the span of the particular application, the weight of the prefabricated structure may render the culvert immovable or impractical to transport.

Accordingly, it is an object of the present invention to provide a prestressed concrete conduit.

It is another object of the present invention to provide a conduit that may be prefabricated and readily transported to the construction site.

It is still another object of the present invention to provide a concrete culvert that may be prefabricated and will provide a maximum capacity with a minimum depth from the road surface.

It is still another object of the present invention to provide a prestressed concrete conduit that will have structural rigidity and strength to permit relatively long spans to be prefabricated, shipped, and subsequently installed at the construction site.

Further objects and advantages of the present invention will become apparent to those skilled in the art as the description thereof proceeds.

Briefly, in accordance with one embodiment of the present invention, a prestressed conduit is provided that is divided along a longitudinal plane into two prestressed concrete portions. The conduit forms a closed channel and may have a rectangular, circular, elliptical, or other cross section suitable for the application intended. The conduit is fabricated by pouring concrete into appropriate molds having steel cable under tension therein in the manner well known in prestressed concrete art. Each portion of the conduit is prestressed so that when it is removed from the mold it assumes a longitudinal set manifested by a curvature relative to the plane at which the conduit is to be joined. Each portion is prestressed to have an opposite or opposing curvature to the mating portion. Thus, an upper and lower half of the concrete conduit would be prestressed so that each is concave or convex relative to the plane at which they will be joined.

The conduit portions, prestressed and exhibiting a curvature as indicated above, may be shipped as they are cured and are removed from the mold, and may be assembled at the construction location. In this manner, relatively light, compact concrete structures are provided that are readily transportable and exhibit sufficient longitudinal rigidity to permit their use as culverts and other conduit applications.

When the portions of the conduit reach the construction site, the opposing curvatures of the respective portions are placed in contact with each other and the two or more portions are banded, bolted or otherwise forced into contact along the curved surfaces until the curvature of each of the portions is removed and the opposing surfaces of each portion are intimately in contact. The respective portions, thus in intimate contact with one another, may be cemented or otherwise permanently secured to form a unitary prestressed concrete conduit joined along a plane longitudinal to the axis of the conduit and which, since the respective portions thereof previously exhibited opposite curvatures, is completely straight.

The present invention may more completely be described by reference to the accompanying drawings in which.

Figure 1:
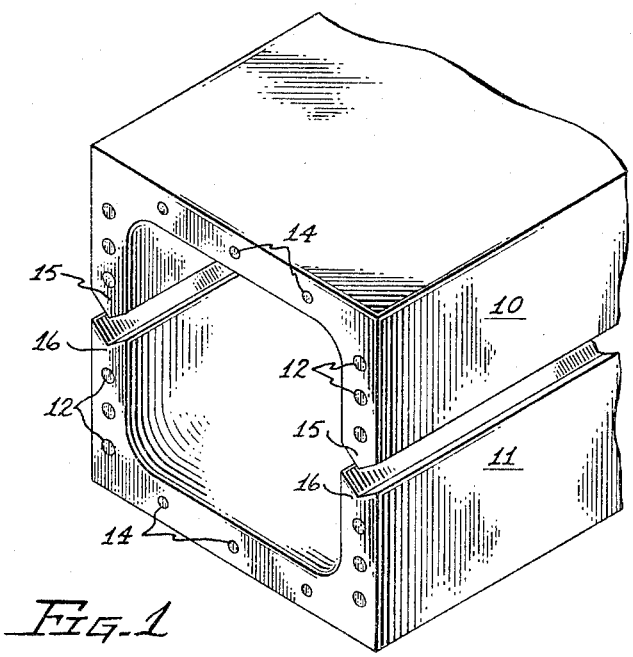
FIGURE 1 is an isometric view, partly in section, of a prestressed concrete conduit constructed in accordance with the teachings of the present invention.
Figure 4:
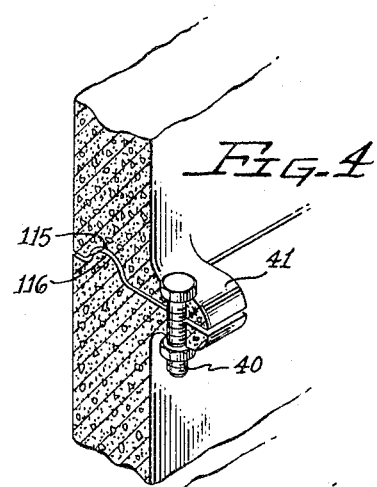
Figure 5:
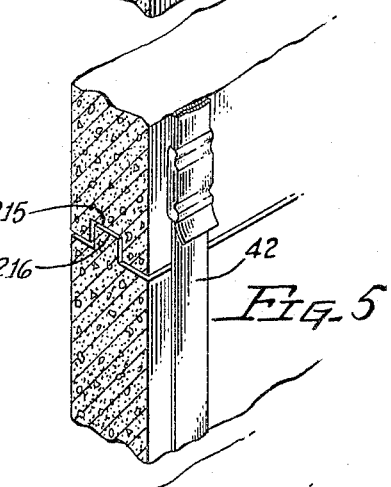
Figure 6:
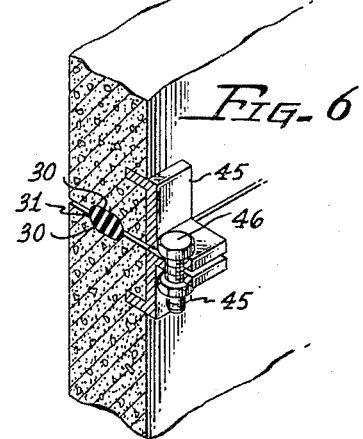

FIGURES 4, 5, and 6 show enlarged joints between the upper and lower portions of FIG. 1 and illustrate various means for sealing and clamping the respective portions of the conduit.

Figure 7:
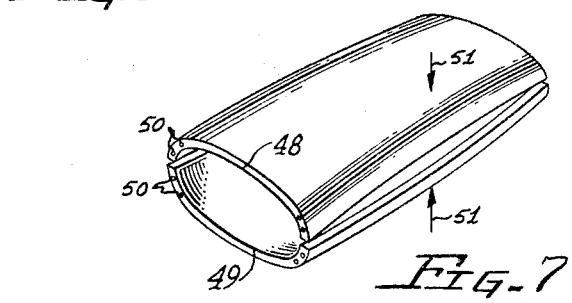

FIGURE 7 is a perspective view of a prestressed concrete conduit constructed in accordance with the teachings of the present invention and illustrating an embodiment having an elliptical cross section.

Figure 8:
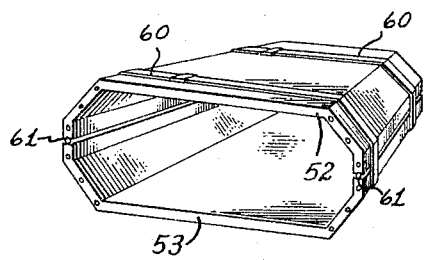

FIGURE 8 is a perspective view of a prestressed concrete conduit constructed in accordance with the teachings of the present invention showing an embodiment having an octagonal cross section.

Figure 9:
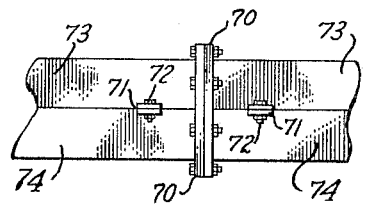

FIGURE 9 illustrates the abutting ends of two prestressed concrete conduits each constructed in accordance with the teachings of the present invention illustrating one method of joining two conduits.

Figure 10:
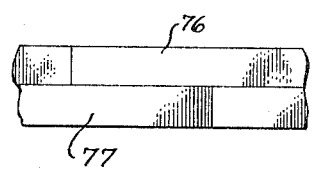
Figure 10:
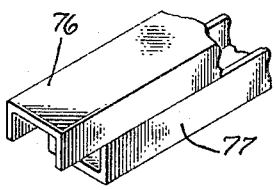

FIGURE 10 illustrates another method for joining two prestressed concrete conduits each constructed in accordance with the teachings of the present invention.

Figure 11:
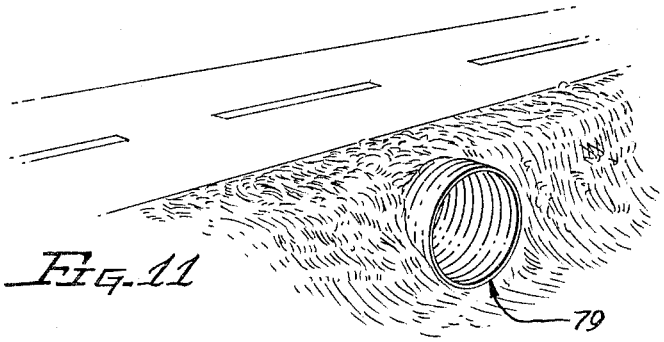

FIGURE 11 illustrates a prior art culvert utilizing a well known right circular cylindrical corrugated pipe.

Figure 12:
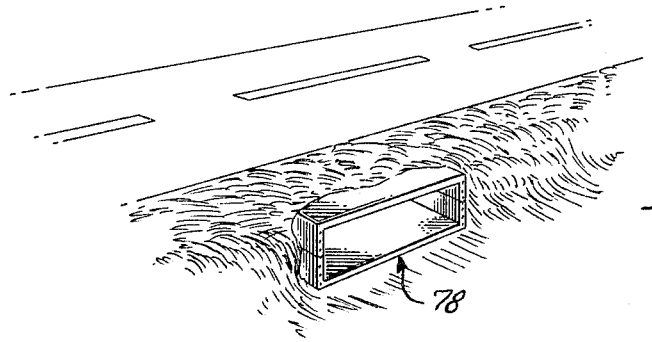

FIGURE 12 illustrates the application of a prestressed concrete conduit of the present invention to a culvert used in place of the prior art culvert shown in FIG. 11.

Referring to FIG. 1, the prestressed conduit shown therein is divided into an upper and lower portion, 10 and 11, each containing prestressing steel cables 12 which, in accordance with usual practice, are placed in the concrete mold while under tension and are permitted to remain in the mold while the concrete sets. The hardened concrete is then removed from the mold with the tensioned cables therein thus forming a prestressed concrete portion. The smaller steel cables 14 indicated in the top and lower portions of the conduit are not prestressing cables and are utilized merely to strengthen the horizontal portions of the conduit. The upper and lower conduit portions shown in FIG. 1 are joined by shaping the upper portion 10 along the mating edge 15 in the form of a taper coinciding with a complementary V-shaped wedge 16 in the lower portion 11. When the conduit is placed at the construction site, the joint between the upper and lower portions of FIG. 1 may be secured in any known manner such as, for example, by epoxy resin or cement.

Figure 2:
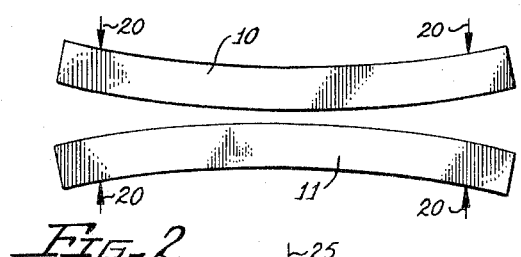
FIGURE 2 is a side view of a prestressed concrete conduit constructed in accordance with the teachings of the present invention showing the upper and lower portions thereof prestressed to provide convex curvatures relative to each other.
Figure 3:
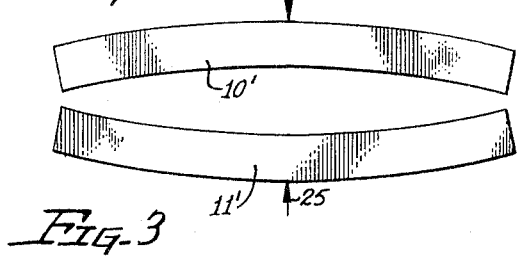
FIGURE 3 is a side view of a prestressed concrete conduit constructed in accordance with the teachings of the present invention showing the respective portions having longitudinal sets to provide concave curvatures relative to each other.

Prestressing the upper and lower portions of the conduit of FIG. 1 may be designed to cause a longitudinal set as shown in FIG. 2 or FIG. 3. The upper and lower portions in FIGS. 2 and 3 are identified by the numerals 10 and 11 and 10' and 11' respectively to correspond with the numerical identification used in FIG. 1. The curvature caused by the prestressing as shown in FIG. 2 (the curvature is greatly exaggerated in FIGS. 2 and 3 to facilitate the description thereof) presents a convex surface opposing the convex surface of the opposite conduit portion. Thus, when the two halves of the conduit are placed in contact with each other, they will first contact at the center of the conduit and will be "bowed" away from each other. Force is then applied as indicated by the arrows 20 to remove the curvature of each of the prestressed portions by forcing the portions against one another thus causing an increasing length of each portion to come in contact with the other portion. When sufficient force has been applied, the two portions will be in intimate contact throughout the length thereof to form a unitary prestressed concrete conduit. As indicated previously, the joints may be cemented, or otherwise sealed, to maintain the portions in intimate contact. The resulting prestressed concrete conduit will therefore be straight, that is, without curvature, and will be prestressed to provide longitudinal rigidity and strength with a minimum of weight. It will readily be apparent that the combination of prestressing to provide a low weight-to-strength ratio combined with the division of the concrete conduit into separate portions renders the prefabricated conduit readily transportable.

Further, the prestressing of the various portions to have curvatures as indicated permits the use of longitudinally divided closed channels as shown in FIG. 1 without sacrificing the strength afforded by prestressing and also providing a means for insuring intimate contact between the various portions when the portions are clamped to form a unitary closed channel.

Referring to FIG. 3, a modification of the prestressing used in FIG. 2 is shown. In FIG. 3, the respective portions 10' and 11' of the prestressed concrete conduit are fabricated to exhibit curvatures that are concave relative to each other. Thus, when the portions are placed in contact at the construction site, force is applied as indicated by the arrows 25 in FIG. 3 to cause the respective portions to contact each other at an increasing length along the contacting surfaces. Thus, the ends of the respective conduit portions would contact each other first and, as force is applied, the portions will contact each other along the opposing surfaces until the centers of both portions are joined to form a unitary prestressed concrete conduit.

The opposing surfaces of the respective portions of the prestressed concrete conduit shown in FIG. 1 are formed into a mating V-shaped slot and tapered edge. Alternative forms of the mating surfaces are shown in FIGS. 4, 5, and 6. FIGURES 4 and 5 indicate different shapes 115 and 116, and 215 and 216, respectively, that may be utilized to seal the respective portions in contact; FIG. 6 illustrates mating surfaces each having a longitudinal indentation 30 extending the length of the conduit for receiving a resilient sealing grommet 31 that may be made from a non-deteriorating compound such as neoprene.

The halves or portions of the conduit may be secured by a series of bolts 40 extending through flanges 41 provided on the portions as shown in FIG. 4, or the respective portions may merely be "banded" and clamped with a band 42 as shown in FIG. 5. Similarly, the portions may be secured in intimate contact by providing steel clips 45 imbedded in the concrete as shown in FIG. 6 and formed to accommodate bolts 46 to thereby tighten and secure the joint between the opposing portions of the conduit. As indicated previously, a cement or appropriate resin may be utilized to permanently secure the portions together; however, the initial force required to remove the curvature of the opposing portions of the culvert or conduit may be applied through the expediency of one of the clamping methods, or their equivalent, as illustrated in FIGS. 4-6.

Referring to FIG. 7, the prestressed concrete conduit illustrated therein represents a conduit having an oval or elliptical cross section. The two halves 48 and 49, forming two open channels, of the conduit are shown as they would appear before clamping illustrating the concave curvature relative to each other of the respective portions. The prestressing steel cables 50 are illustrated in FIG. 7, and the force necessary to remove the curvature of the respective portions of the conduit is schematically shown by the arrows 51. FIGURE 8 shows a closed channel, having an octagonal cross section, divided into two open channel members 52 and 53 that are clamped through the expediency of steel bands 60 and sealed along the opposing surfaces of the respective open channels by a resilient material 61 of the type described in connection with FIG. 6. The members 52 and 53 may be stressed by the manner shown in either FIGS. 2 or 3, illustratively.

In those applications where it is necessary to connect one prestressed concrete conduit to another, the respective sections of conduit may be provided by a lip or enlarged angular flange 70 as shown in FIG. 9 for abutment against a corresponding angular flange on the succeeding section of conduit. Steel clips 71 and bolts 72, similar to those shown in FIG. 6, may be used for pulling curved opposing faces of conduit elements 73 and 74 together. Alternatively, since the conduit of the present invention is assembled at the construction site, it is possible to stagger the top and bottom conduit portions 76 and 77 to provide interlocking as shown in FIG. 10 to yield a continuous prestressed conduit. The structure of FIG. 10 may be sealed or clamped in any convenient manner such as those techniques indicated previously in connection with the preceding figures.

An illustration of the application of one embodiment of the present invention will serve to exemplify the advantages presented by the prestressed concrete conduit described herein. A comparison of FIGS. 11 and 12 will indicate to those skilled in the art that the same capacity may be achieved by the prestressed concrete conduit 78 of the present invention, shown in FIG. 12, as the large, and bulky right circular cylindrical corrugated pipe 79 shown in FIG. 11. The depth necessary, as measured from the road bed, for the pipe of FIG. 11 is substantially in excess of that necessary for the conduit of the present invention shown in FIG. 12. Further, the structural rigidity provided by the prestressed concrete conduit of the present invention lends itself to the utilization of a single span to provide adequate conduit length for very long conduits.

It will be obvious to those skilled in the art that many modifications of the present invention may be made without departing from the spirit and scope thereof; accordingly, the scope of the present invention is limited only by the claims appended hereto.

What is claimed is:

1. A conduit comprising: a first and a second prestressed concrete portion having opposing surfaces for forming, when placed in abutting relation with each other, a closed channel; each of said portions having a longitudinal set to form equal but opposite curvatures in said opposing surfaces; and means for clamping said opposing surfaces in abutting relation with each other at a plurality of positions to hold said normally curved opposing surfaces together in substantially a straight line.

2. A method of manufacturing a concrete conduit comprising: forming a pair of prestressed generally channel shaped concrete portions having opposing side edge surfaces for providing, when placed in abutting relation with each other, a closed channel; the prestressing of each of said concrete portions providing a longitudinal set to form opposite curvatures in said opposing side edge surfaces; and clamping said opposing surfaces in abutting relation with each other at a plurality of positions substantially to remove the curvature in each of said opposing surfaces.

3. A conduit comprising
   (a) a pair of concrete members with opposed edges shaped, when said edges are brought together to form a section of conduit,
   (b) concrete prestressing cables extending substantially longitudinally through the two conduit members and normally holding the said members in curved condition and with edges of the members having opposite curvilinear relation, and
   (c) means for clamping said members together at a plurality of positions along their length to hold said mutually engaging edges of the members in generally rectilinear position with respect to the conduit's radius.

4. A conduit as defined in claim 3, including means for sealing said conduit where said edges engage each other.

5. A conduit as defined in claim 3, including means for sealing ends of two such conduits together.

References Cited by the Examiner
UNITED STATES PATENTS

| | | | |
|---|---|---|---|
| 1,638,428 | 8/1927 | Zander | 138—177 X |
| 2,039,398 | 5/1936 | Dye | 52—223 X |
| 3,111,965 | 2/1958 | Hodge | 138—176 |

LAVERNE D. GEIGER, *Primary Examiner.*

SAMUEL ROTHBERG, *Examiner.*

T. MOORHEAD, *Assistant Examiner.*